United States Patent
Fritz et al.

(10) Patent No.: US 9,853,840 B2
(45) Date of Patent: Dec. 26, 2017

(54) RECEIVER UNIT AND RECEIVING METHOD

(71) Applicant: Sony Corporation, Tokyo (JP)

(72) Inventors: Martin Fritz, Stuttgart (DE); Rana Ahmed Salem, Stuttgart (DE); Ben Eitel, Gaertringen (DE)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/042,407

(22) Filed: Feb. 12, 2016

(65) Prior Publication Data

US 2016/0261438 A1 Sep. 8, 2016

(30) Foreign Application Priority Data

Mar. 2, 2015 (EP) .................................... 15157239

(51) Int. Cl.
*H04L 25/03* (2006.01)

(52) U.S. Cl.
CPC .. *H04L 25/03057* (2013.01); *H04L 25/03159* (2013.01); *H04L 2025/03522* (2013.01); *H04L 2025/03611* (2013.01)

(58) Field of Classification Search
CPC ............ H03H 7/30; H03K 5/159; H04B 1/10; H04B 3/23; H04B 3/46; H04B 17/00; H04L 5/12; H04L 25/03; H04L 25/03057; H04L 25/03261; H04L 25/03076; H04L 27/06
USPC ........ 370/201, 286, 292; 375/229, 332, 333, 375/316, 341, 346, 348
See application file for complete search history.

(56) References Cited

U.S. PATENT DOCUMENTS

| | | | |
|---|---|---|---|
| 6,744,814 B1 * | 6/2004 | Blanksby .......... | H04L 25/03235 375/229 |
| 6,996,230 B1 * | 2/2006 | Chu ..................... | H04B 3/23 370/286 |
| 8,331,510 B2 | 12/2012 | Khayrallah et al. | |
| 2010/0254446 A1 * | 10/2010 | Khayrallah ....... | H04L 25/03178 375/232 |
| 2012/0002712 A1 * | 1/2012 | Hayami ........... | G11B 20/10009 375/232 |
| 2015/0009793 A1 | 1/2015 | Schwager et al. | |
| 2015/0249557 A1 * | 9/2015 | Dorman ............ | H04L 25/03292 375/233 |

OTHER PUBLICATIONS

Stefano Tomasin et al. "Frequency-Domain Interference Cancellation and Nonlinear Equalization for CDMA Systems", IEEE Transactions on Wireless Communications, vol. 4, No. 5, Sep. 2005, 11 pages.

(Continued)

*Primary Examiner* — Shawkat M Ali
(74) *Attorney, Agent, or Firm* — Oblon, McClelland, Maier & Neustadt, L.L.P.

(57) ABSTRACT

A receiver unit comprising a signal input configured to receive a receive signal including a plurality of data symbols, a symbol detection circuit configured to detect a subset of data symbols, a reliability measuring circuit configured to determine a reliability value for the data symbols, a feedback loop configured to detect the subset of data symbols and the reliability value iteratively, and a signal output circuitry configured to determine output values of the subset of data symbols on the basis of the detected subset of data symbols and the determined reliability value.

15 Claims, 9 Drawing Sheets

(56) References Cited

OTHER PUBLICATIONS

Nevio Benvenuto et al. "Single Carrier Modulation with Nonlinear Frequency Domain Equalization: An Idea Whose Time Has Come—Again", Proceedings on the IEEE 98.1, 2010, 28 pages.
Fabrizio Pancaldi et al. "Single-Carrier Frequency Domain Equalization", IEEE Signal Processing Magazine, vol. 2, Sep. 2008, 22 pages.

* cited by examiner

RECEIVER UNIT AND RECEIVING METHOD

CROSS REFERENCE TO RELATED APPLICATIONS

The present application claims priority to European Application EP15157239.3 filed on 2 Mar. 2015, the contents of which being incorporated herein by reference in its entirety.

BACKGROUND

Field of the Disclosure

The present disclosure relates to a receiver unit and a corresponding receiving method. Further, the present disclosure relates to a computer program and a non-transitory computer-readable recording medium.

Description of Related Art

Many currently available receivers for receiving and processing signals like TV signals comprise single carrier or multi carrier frequency domain equalizer perform frequency domain equalization. Problems may arise if the received signal is lacking full circularity.

The equalization is divided into two phases an initial reception phase and an iterative processing phase. The iterative processing phase applies a cyclic prefix reconstruction and a frequency domain equalization iteratively to improve the symbol decision quality. The iterative processing comprises applying the cyclic prefix reconstruction to the interblock interference cancellation output, a frequency domain equalization of the symbol blocks, obtaining new symbol decisions which are again used for an improved cyclic prefix reconstruction during the next iteration step and providing an output of final symbol decisions to a following receiver stage when the required symbol decision quality is achieved or a defined number of iteration is reached.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

A disadvantage of the receiver units known from the prior art is that the iterative processing does not converge reliably and that the system is unstable for common wireless channel models and achieves the convergence only for some special constructed channels or when involving channel decoder in the iterative processing.

It is an object to provide an improved receiver unit and an improved receiving method which enable an improved reception of a receive signal and which provides a precise symbol detection. It is a further object to provide a computer program and a non-transitory computer-readable recording medium for implementing a receiving method.

According to an aspect there is provided a receiver unit comprising:

a signal input configured to receive a receive signal including a plurality of data symbols, a symbol detection circuit configured to detect a subset of data symbols, a reliability measuring circuit configured to determine a reliability value for the data symbols, a feedback loop configured to detect the subset of data symbols and the reliability value iteratively, and a signal output circuitry configured to determine output values of the subset of data symbols on the basis of the detected subset of data symbols and the determined reliability value.

According to a further aspect there is provided a receiver unit comprising a signal input configured to receive a receive signal including a plurality of signal blocks each having a plurality of data symbols, block overlap generation circuit configured to generate an overlapping signal block on the basis of the plurality of signal blocks, an overlapping block separation circuit configured to remove an overlapping end part from the overlapping signal block and to provide a reduced overlapping signal block, a symbol detection circuit configured to detect a subset of data symbols on the basis of the overlapping signal block, and a feedback loop configured to feed the reduced overlapping signal block back and to remove the overlapping signal block iteratively.

According to a further aspect there is provided a receiver unit comprising a signal input configured to receive a receive signal including a plurality of signal blocks each having a plurality of data symbols, a processing block generation circuit configured to determine processing blocks, wherein each processing block comprises a data block and an overlapping part of a following processing block, wherein the processing block generation circuit is configured to determine a length of the overlapping part on the basis of a channel impulse response.

According to a further aspect there is provided a receiving method comprising:

receiving a receive signal including a plurality of data symbols, detecting a subset of data symbols by means of a symbol detection circuit, determining a reliability value for the data symbols, detecting the subset of data symbols and the reliability value iteratively via a feedback loop, and providing output values of the subset of data symbols on the basis of the detected subset of data symbols and the determined reliability value.

According to still another aspect a receiving method is provided comprising receiving a receive signal including a plurality of signal blocks each having a plurality of data symbols, generating an overlapping signal block on the basis of the plurality of signal blocks, removing an overlapping end block from the overlapping signal block and providing a reduced overlapping signal block, detecting a subset of data symbols on the basis of the overlapping signal block, and feeding the reduced overlapping signal block back and removing the overlapping signal block iteratively.

According to still another aspect a receiving method is provided comprising receiving a receive signal including a plurality of signal blocks each having a plurality of data symbols, determining processing blocks, wherein each processing block comprises a data block and an overlapping part of a following processing block, wherein a length of the overlapping part is determined on the basis of a channel length.

According to still further aspects a computer program comprising program means for causing a computer to carry out the steps of the methods disclosed herein, when said computer program is carried out on a computer, as well as a non-transitory computer-readable recording medium that stores therein a computer program product, which, when executed by a processor, causes a method disclosed herein to be performed are provided.

Embodiments are defined in the dependent claims. It shall be understood that the claimed receiving method, the claimed computer program and the claimed computer-readable recording medium have similar and/or identical embodiments as the claimed receiver unit and as defined in the dependent claims.

One of the aspects of the present disclosure is to determine output values on the basis of the determined subset of data symbols and a determined reliability value, wherein the data symbols are iteratively determined according to the reliability value. By means of this, the iterative symbol detection can be improved and an error propagation due to the iterative process can be avoided. Hereby, a stable receiving system can be provided having a general convergence regarding the symbol detection so that a precise receiving of the symbols can be achieved.

Another aspect of the disclosure is to provide a longer overlapping signal block to the system and to remove overlapping end parts iteratively from the overlapping signal block so that an interfering end portion of the overlapping block can be separated during each iteration and the precision of the receiving of the signal block can be improved.

Another aspect of the disclosure is to divide the received signal blocks into processing blocks each comprising a data block and an overlapping part of a following processing block in order to reduce the inter-block error propagation by inter-block interference. The length of the overlapping end block is optimized to the channel length so that the overlapping overhead can be minimized. Hereby a reduced complexity of the symbol detection can be achieved with a reduced inter-block interference.

It is to be understood that both the foregoing general description of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
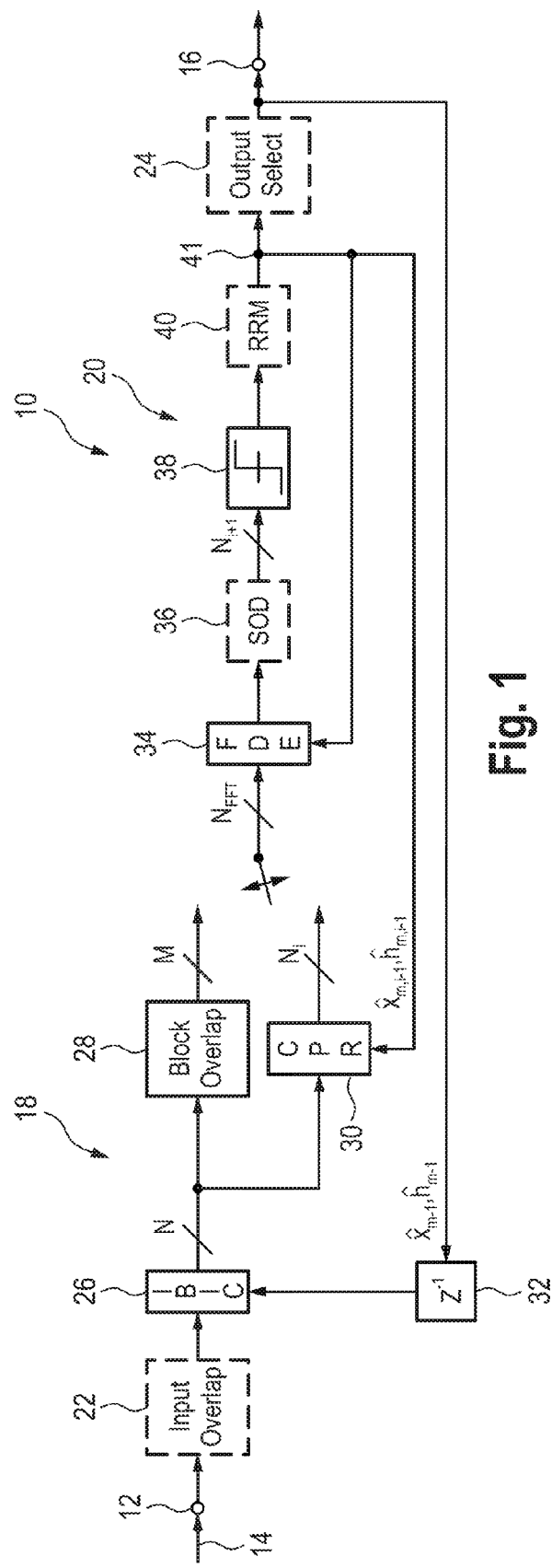
FIG. 1 shows a schematic block diagram of a receiver unit according to the present disclosure.

Referring now to the drawings, wherein like reference numerals designate identical or corresponding parts throughout the several views, FIG. 1 shows a schematic block diagram of a receiver unit 10 according to the present disclosure.

The receiver unit 10 in general comprises a signal input 12, which is configured to receive a receive signal 14 comprising a plurality of consecutive signal blocks each having a plurality of data symbols. The receiver unit 10 further comprises a signal output 16 which is configured to provide processed output values including detected symbols to a following receiver stage.

The receiver unit 10 comprises a processing unit 18 connected to the signal input 12 and an iterative equalizer 20, which is connected to the processing unit 18 and connected to the signal output 16 for providing the processed signals to the following receiver stage.

The receiver unit 10 is in general provided for single carrier or multi carrier reception in mobile environment and the receive signal 14 may be correspondingly a single carrier or a multi carrier remote signal.

The receiver unit 10 comprises an input block processing unit 22 connected to the signal input 12 and an output selection unit 24 connected to the signal output 16. The input block processing unit 22 determines processing blocks on the basis of the received signal 14, wherein the processing blocks comprise a data block and an overlapping signal block corresponding to an initial part of the following data block. The overlapping signal block is set to a length corresponding to the channel length of the receiver unit 10 so that the overlapping signal block is optimized to the system in general and an overhead of the input overlapping can be reduced. Further, a reduction of the interblock error propagation can be achieved. The output selection unit 24 removes the overlapping signal block before the output values are provided to the signal output 16.

The processing unit 18 comprises an inter-block-interference canceller 26 which cancels the inter-block-interference. The inter-block-interference canceller 26 is connected to a block overlap 28 and a cyclic prefix reconstruction 30 which are connected in parallel to each other. The iterative equalizer 20 is connected alternatively to the block overlap 26 or to the cyclic prefix reconstruction 28 for receiving an initial signal input or for iterative processing of the signal blocks and for determining the symbols within the receive signal 14.

The output signal at the signal output 16 is fed back to the inter-block-interference canceller 26 in order to cancel the inter-block-interference of a following data block as indicated by a time shift unit 32. The output of the iterative equalizer 20 is fed back to the cyclic prefix reconstruction 30 and/or to an input of the iterative equalizer 20 in general in order to provide an iterative signal detection.

The iterative equalizer 20 comprises a frequency domain equalizer 34 connected to a signal block separation unit 36 which is connected to a symbol detector 38. The symbol detector 38 is connected to a reliability measurement unit 40. A symbol output 41 of the reliability measurement unit 40 is fed back to an input of the frequency domain equalizer 34 and/or to the cyclic prefix reconstruction 30 in order to provide an iterative equalization and to recreate a circularly convolution of the signal block to be processed.

The symbol detector 38 detects an equalized symbol provided by the frequency domain equalizer 34 and provides the detected equalized symbol to the reliability measurement unit 40. The reliability measurement unit 40 determines reliability value on the basis of the equalized and/or detected symbol compared to predefined possible symbols of the modulation scheme. The so determined equalized and/or detected symbol is fed back based on the corresponding reliability value to the frequency domain equalizer 34 and/or to the cyclic prefix reconstruction 30 in order to recreate the circularly convoluted signal block. Since merely the equalized and/or detected symbol are fed back based on the reliability or quality of the detection for the circular convolution, a stable feedback loop and a reliable convergence in general can be achieved and error propagation can significantly be reduced. Further, the so determined symbols are selected by the output selection unit 24 and fed back to the inter-block-interference canceller 26 in order to process the following signal block on the basis of the determined symbol.

The signal block separation unit 36 successively drops erroneous overlapping end blocks or end parts over each iteration in order to perform an improved cyclical prefix reconstruction. To apply this successive overlap dropping, a longer overlapping block is provided to the iterative equalizer 20, wherein the length depends on how much shall be dropped or separated per iteration and how many iterations shall be performed. By dropping or separating overlapping end blocks or end parts by means of the signal block separation unit 36, an interference end portion can be separated or dropped, so that a precise remaining signal can be achieved. The signal block separation unit 36 drops preferably half of the initial reception signal in each of the iterations until a single block is provided to the symbol detector 38. A further typical length of the overlapping blocks to be separated corresponds to the channel length or the channel impulse response.

The receiver unit 10 therefore provides different possibilities to achieve a precise symbol detection, wherein the input overlap 22, the symbol block separation unit 36 and the reliability measurement unit 40 may be each separately implemented in one separate receiver unit 10 or in an arbitrary combination. In other words the receiver unit 10 may comprise merely the input overlap 22 or merely the signal block separation unit 36 or merely the reliability measurement unit 40. Further, the receiver unit 10 may comprise two of these elements or as shown in FIG. 1 all of these elements in order to improve the symbol detection.

The receiver 10 makes frequency domain equalizer in particular applicable for highly mobile environments with fast-fading channel conditions, while meeting the constraint of low power consumption. Further, no decoding of the receive signal is required.

Figure 2:
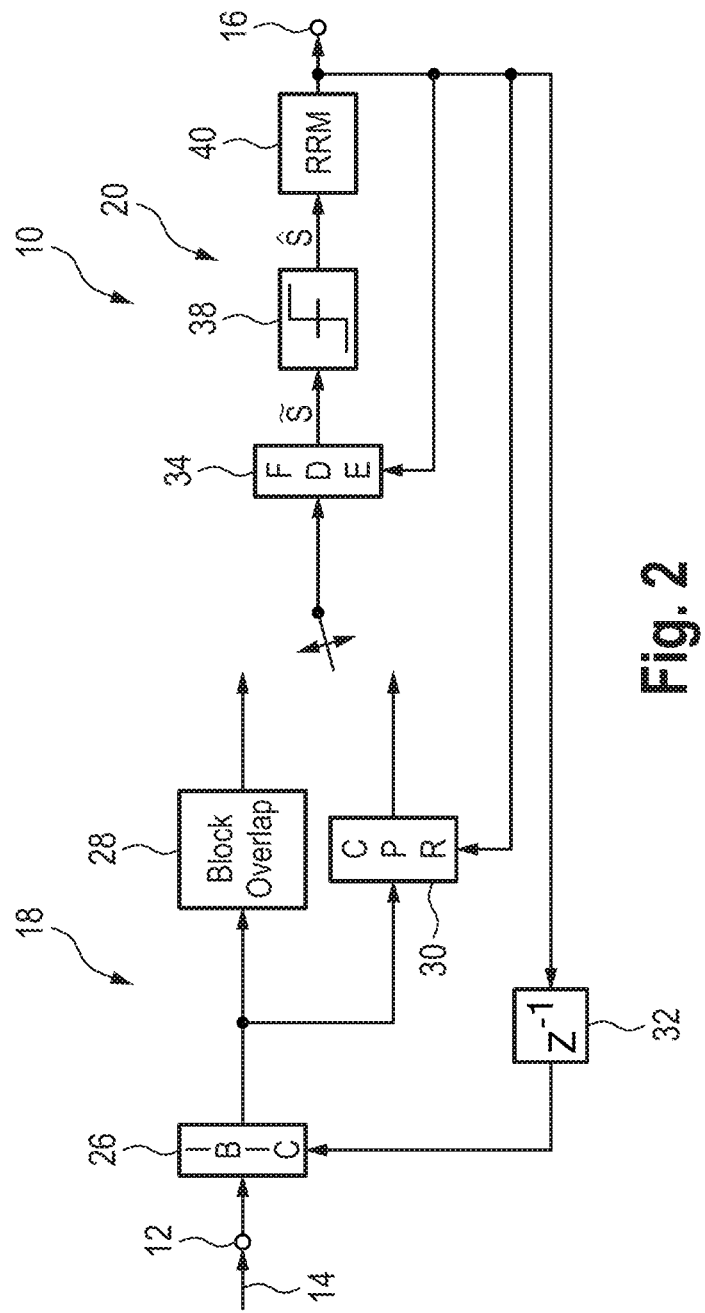
FIG. 2 shows a schematic block diagram of one embodiment of the receiver unit according to the present disclosure, FIG. 3a, b shows schematic illustration of symbol decisions according to one embodiment of the present disclosure.

FIG. 2 shows a schematic block diagram of one embodiment of the receiver 10 including the reliability measurement unit 40. The symbol detector 38 determines a symbol of the used symbol alphabet and provides the symbol to the reliability measurement unit 40, wherein the reliability measurement unit 40 determines a reliability value of the detected symbol on the basis of the equalized symbol and the detected symbol and/or a plurality of possible symbols dependent on the transmission scheme.

The so determined expected or desired symbol is fed back to the frequency domain equalizer 34 and/or to the cyclic prefix reconstruction 30 and/or to the inter-block-interference canceller 26 in order to reconstruct the circular convolution of the received block. After a plurality of iteration steps, the determined symbols are provided to the signal output 16 in order to provide the symbols to a connected receiver stage.

Figure 3A:
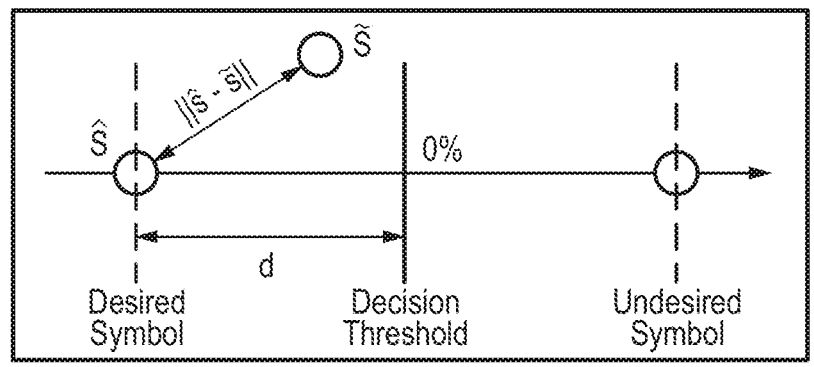

FIG. 3a, b show different diagrams illustrating the determination of the expected or desired symbols on the basis of the received symbols and a reliability value.

In FIG. 3a the expected or desired symbol, is determined on the basis of an Euclidean distance between the equalized symbol, which is denoted by $\tilde{s}$ and the detected symbol $\hat{S}$ and/or a plurality of possible symbols which are defined by the transmission scheme (depending on the exact used reliability measure). The predefined symbol, which has the lowest distance to the received symbol $\tilde{s}$ is selected by the reliability measurement unit 40 as the expected symbol $\hat{s}$.

The Euclidean distance is determined by:

$$ED = \|\tilde{s} - \hat{s}\| \qquad (Eq.\ 1)$$

wherein $\hat{s}$ is the detected symbol and $\tilde{s}$ is the equalized symbol and $\|.\|$ is the vector operator for element wise absolute value.

Figure 3B:
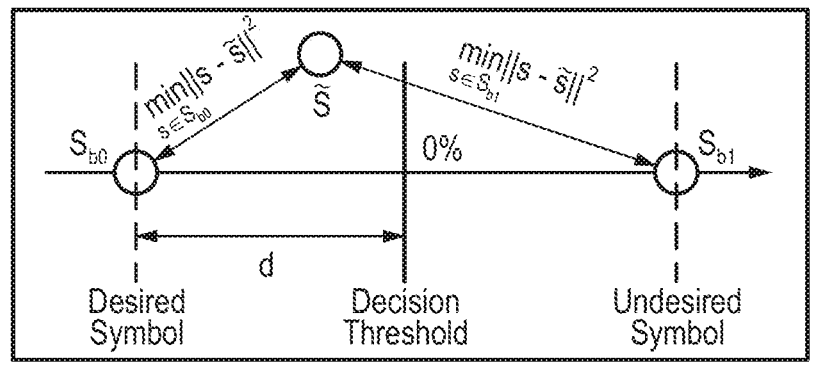

In FIG. 3b a further possibility is shown to determine the expected or desired symbol based on an approximate Log-Likelihood-Ratio (LLR).

The approximate Log-Likelihood-Ratio of the weakest bit is determined by:

$$LLR(b_{weakest}) = \min_{bit \in symbol}\left[\frac{1}{\sigma^2}\left(\min_{s \in S_{b0}} \|s - \tilde{s}\|^2 - \min_{s \in S_{b1}} \|s - \tilde{s}\|^2\right)\right] \qquad (Eq.\ 2)$$

wherein $S_{b0}$ and $S_{b1}$ are the nearest symbols where a bit of the symbol is 0 and 1, respectively. This LLR is calculated for each bit of a symbol and finally the LLR of the weakest bit is used.

The reliability measurement unit 40 can further determine a reliability value on the basis of the difference between the equalized symbol $\tilde{s}$ and the detected symbol $\hat{s}$. To determine the reliability value or the confidence value, the above mentioned Euclidean distance (ED) or the Log-Likelihood-Ratio (LLR) or an approximate LLR or the like can be utilized. The reliability measurement unit 40 compares the reliability values of the detected symbol block of current iteration with the reference reliability values which were obtained in previous iteration. The symbols of current iteration with improved reliability are updated in the feedback to the frequency domain equalizer 34, the cyclic prefix reconstruction 30 or the interblock interference canceller 26 as mentioned above. All symbols with worse reliability are taken from previous iteration. By means of this decision based on the reliability value, an improved performance gain and an improved convergence can be provided.

As a stopping criterion for the iterative process, the reliability value can be used as an absolute criterion or a relative criterion. The absolute stop criterion may be that the iteration stops when the reliability value reaches a certain level, i.e. an absolute threshold level. The relative stop criterion may be that the iterative process stops when the reliability value changes only insignificantly (i.e. algorithm has converged) from previous to current iterations so that a reliability value gradient is below a certain level or threshold. In a bi-directional system with variable guard interval length, the reliability value might also be used for request longer or shorter guard intervals depending on the reliability of the detected symbols.

The reliability measurement unit 40 performs loop tracking based on the reliability value, wherein the reliability value is a direct measure of symbol detection quality and hence it is directly proportional to the required feedback control for the iterative equalizer 20. By using the feedback control on the basis of the already used reliability values, a gain in performance and convergence speed can be achieved so that a better symbol detection quality is achieved and less iterations are necessary.

Basically the reliability value has to be converted from its original value to a feedback control value range from 0% (completely unreliable) to 100% (fully reliable). Full reliability is typically never achieved in reality and it proved to be better, in order to avoid error propagation) to saturate to some maximum value <100% (e.g. 90%).

Figure 4:
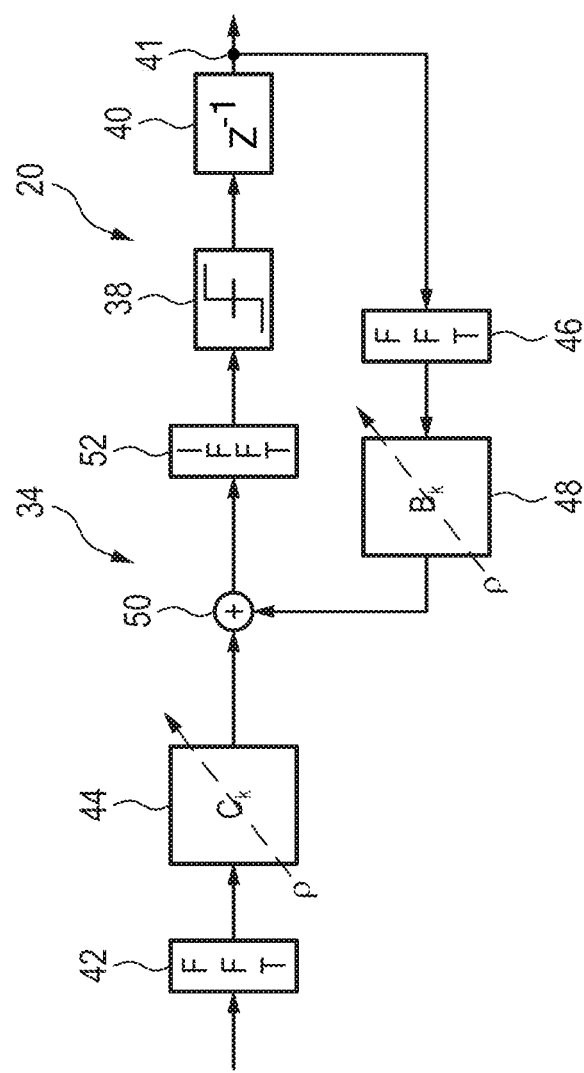
FIG. 4 shows a schematic block diagram of a frequency domain equalizer according to one embodiment of the present disclosure.

In FIG. 4 a detailed block diagram of the iterative equalizer 20 and the frequency domain equalizer 34 is schematically shown. The frequency domain equalizer 34 comprises at the input a Fourier transformation unit 42 connected to a filter device 44. The feedback loop from the symbol output 41 of the symbol decision unit 40 is fed back via a Fourier transformation unit 46 and a filter device 48, wherein the output signals of the filter devices 44, 48 are combined at a summation point 50 and provided via an inverse Fourier transformation unit 52 to the symbol detector 38. The inverse Fourier transformation unit 52 and Fourier transformation unit 46 are only required for single carrier frequency domain equalizer, but not for OFDM.

The filter devices 44, 48 each have a filter coefficient ρ, wherein the filter coefficient ρ is determined on the basis of the reliability value of the expected or desired symbol received from the reliability measurement unit 40.

The filter coefficient ρ can be determined on the basis of the Euclidean distance by:

$$\rho = \text{mean}\left(1 - \frac{ED}{d}\right) \quad \text{(Eq. 3)}$$

wherein ED is the Euclidean distance and d is the distance of the detected symbol to a decision threshold. Alternatively, the filter coefficient ρ can be determined by:

$$\rho = \text{mean}\left(\frac{LLR(b_{weakest})}{1 + LLR(b_{weakest})}\right) \quad \text{(Eq. 4)}$$

wherein the Log-Likelihood-Ratio LLR of the weakest bit is determined by formula 2.

In the case of Log-Likelihood-Ratio and approximate Log-Likelihood-Ratio values, the feedback value can be calculated as mean(|LLR/(1+LLR)|), i.e. mapping the positive infinity and the negative infinity to one and zero to zero for the case when a symbol falls exactly on the decision threshold between two neighboring points, respectively. For the case of the Euclidean distance, the feedback value can be calculated as mean(1−ED/d), wherein d is the distance between the detected value and the decision threshold. The Euclidean distance based feedback control value can be further optimized by adjusting the actually considered distance d: by shifting the 100% point from the expected symbol position closer to the detection threshold, the feedback control gets more optimistic; by shifting the 0% point from the detection threshold closer to the expected or desired symbol, the feedback control gets more pessimistic.

Figure 5:
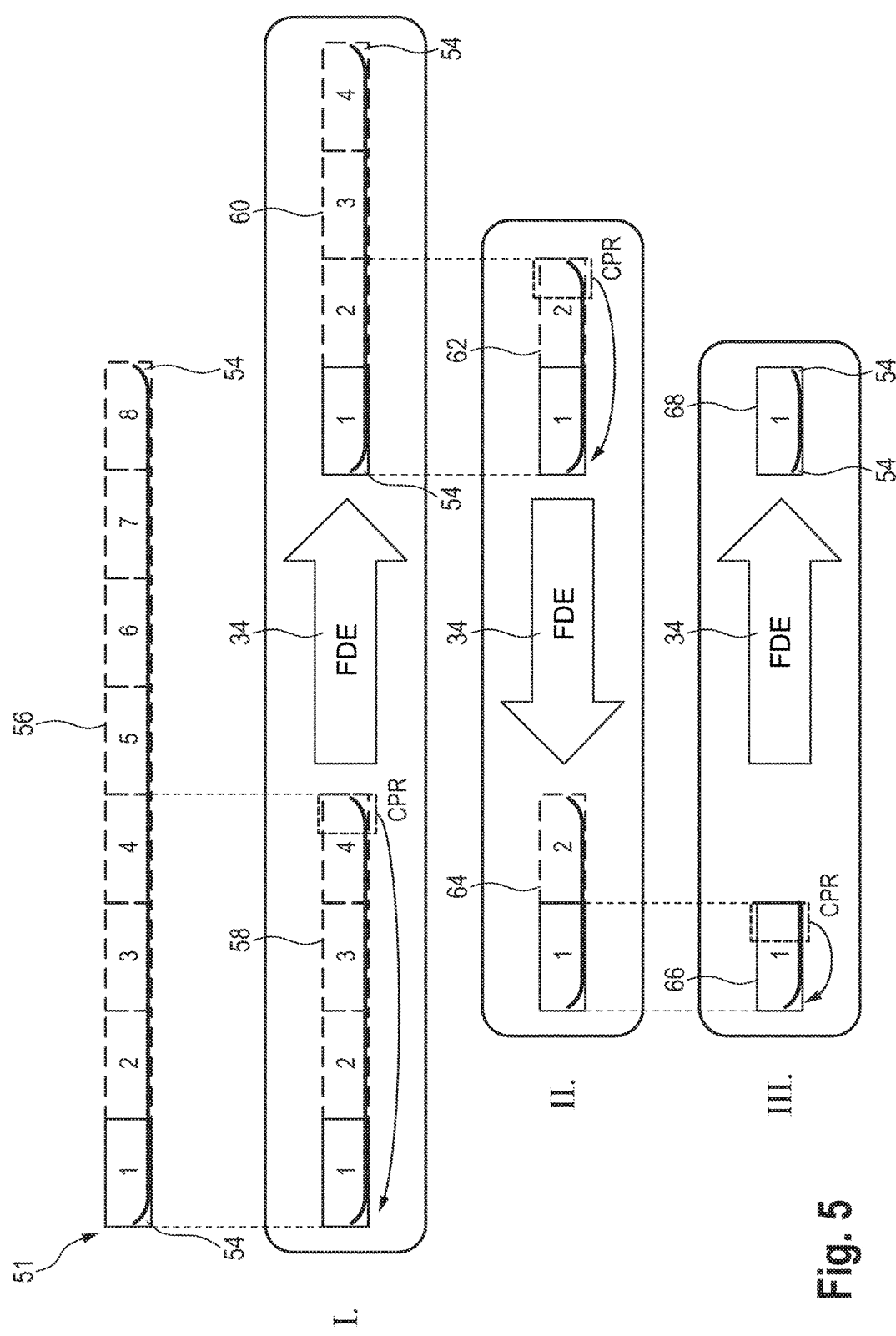
FIG. 5 shows a schematic diagram illustrating iterative signal block separation.

FIG. 5 shows a schematic illustration of the separation of overlapping blocks from the plurality of signal blocks performed by the signal block separation unit 36.

The equalized signal 51 comprises in this particular case eight data blocks, which are forwarded to the iterative equalizer 20 and forms a first input signal 56. The equalized signal 51 is especially at the beginning and at the end impaired by an interference 54, which is schematically shown in FIG. 5 and which provides uncertainties and erroneous symbol decisions. In a first iterative step I., the signal block separation unit 36 drops a second half of the input signal, i.e. the fifth to the eighth block and forwards merely the first to the fourth block to the frequency domain equalizer 34 as an input signal 58, wherein the processing unit 18 determines the circular convolution as explained above by using the expected or desired symbols by the cyclical prefix reconstruction. After the first iterative step I., a signal output 60 of the frequency domain equalizer 34 comprises four blocks and has a reduced interference 54.

In a second iterative step II., the signal block separation unit 36 drops or separates the blocks 3 and 4 from the output signal 60 of the frequency domain equalizer 34 and provides a reduced input signal 64. The processing unit 18 determines the circular convolution signal on the basis of the symbol detection and the cyclical prefix reconstruction as mentioned above so that a further reduced interference at the beginning and the end of an output signal 62 can be achieved.

In a third iteration step III., the signal block separation unit 36 drops or separates the second block from the output signal 62 and provides a reduced input signal 66 and the frequency domain equalizer 34 performs a circular convolution on the basis of the symbol detection and the cyclical prefix reconstruction so that the resulting signal 68 corresponding to the first block comprising a reduced interference as shown in FIG. 5.

The length of the initial input signal 56 depends on how many blocks shall be dropped per iteration step I-III and how many iteration steps I-III shall be performed. For a convenient implementation of radix-2 FFT, overlapping block separation unit 36 always half of the previous blocks are dropped as shown in FIG. 5. Alternatively in more flexible FFT implementations like radix-r, mixed radix, prime number, etc. or Bluestein Algorithms for arbitrary FFT sizes, it is possible to optimize the length of the block which shall be separated or dropped by the overlapping block separation unit 36 per iteration. Typically dropping a length identical to the channel length or the channel impulse response is sufficient.

Hence, due to the reduction of the interference 54, the precision of the reception of the equalized signal 51 can be improved.

Figure 6:
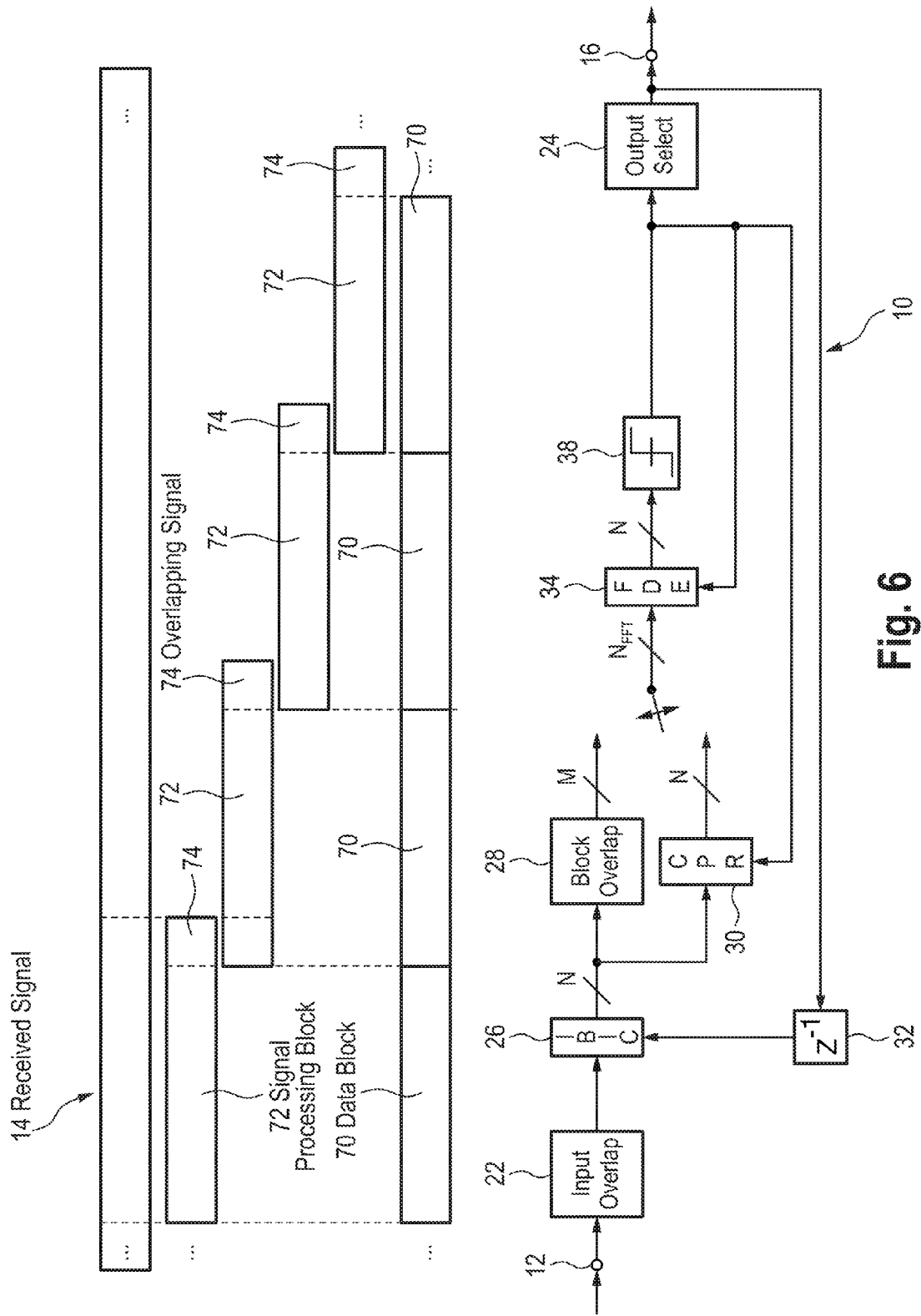
FIG. 6 shows a diagram illustrating processing data blocks including overlapping end blocks.

FIG. 6 shows a diagram illustrating processing data blocks which include overlapping signal blocks in order to reduce the inter-block-interference. In FIG. 6, the receiver unit 10 including the input block processing unit 22 and the output selection unit 24 is schematically shown as one embodiment of the present disclosure.

The received signal 14 is schematically shown as a continuous data stream, wherein the received signal 14 comprises the data blocks 70. The input block processing unit 22 determines the receive signal processing blocks 72 including the respective data block 70 and an overlapping signal block 74. The overlapping signal block 74 corresponds to the first portion of the following data block 70.

The overlapping end blocks are determined having a length corresponding to the channel length or the channel impulse response of the receiver unit 10. By means of this, the length of the overlapping end blocks 74 can be optimized and the overlapping overhead can be minimized so that a reduced complexity of the processing can be achieved.

Preferably, the overlapping end blocks 74 have a length identical with the channel length or the channel impulse response or less.

Figure 7:
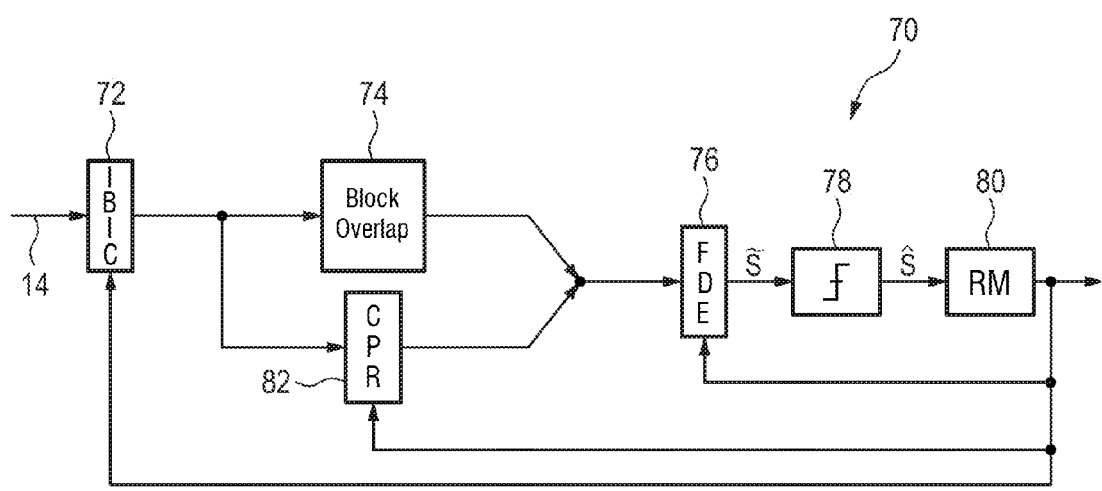
FIG. 7 shows a flow diagram of a receiving method of one embodiment of the present disclosure.

FIG. 7 shows a schematic flow diagram of a receiving method according to one embodiment of the present disclosure. The receiving method is generally denoted by 70. The receiving method 70 is preferably executed the receiver 10 shown in FIG. 2.

The method 70 starts with an inter-block-interference canceling 72 by means of the inter-block-interference canceler 26. In a first iterative step, a block overlap is determined as shown at step 74. At step 76 equalized symbols are determined by means of the frequency domain equalizer 34. At step 78, a subset of data symbols is detected by means of the symbol detector 38 and at step 80 the reliability value is determined by means of the reliability measurement unit 40. The so determined reliability value and the detected subset of data symbols are fed back to the frequency domain equalization step 76, to the inter-block-interference canceling 72 and/or to a cyclic prefix reconstruction step 82 performed by the cyclical prefix reconstruction 30. The subset of data symbols and the reliability values are determined iteratively by means of the feedback loop shown in FIG. 7 and output values of the subset of data symbols are provided at the signal output 16 on the basis of the determined subset of data symbols and the determined reliability values.

Figure 8:
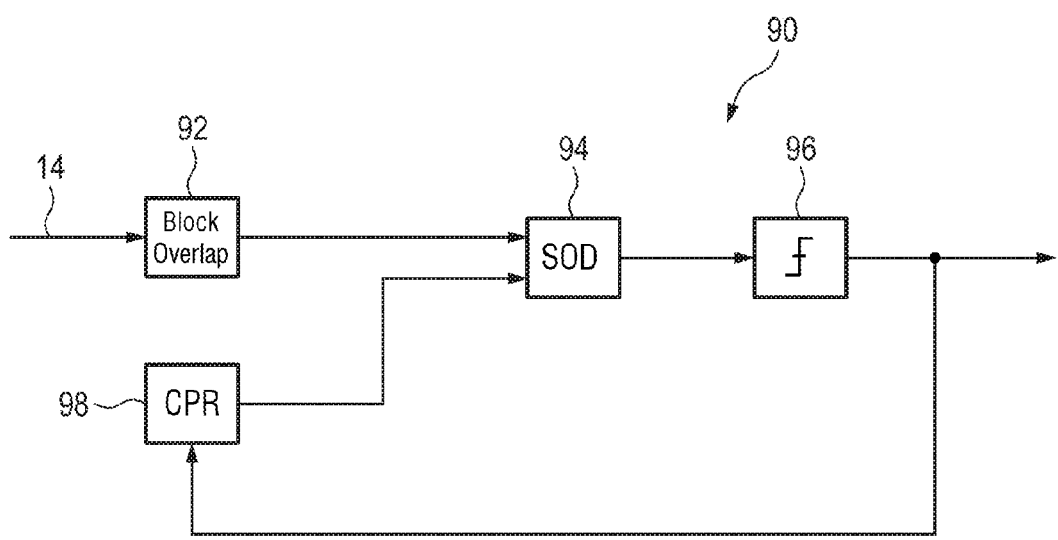
FIG. 8 shows a flow diagram of a receiving method of a further embodiment of the present disclosure.

FIG. 8 shows a schematic flow diagram of a receiving method according to a further embodiment of the present disclosure. The receiving method is generally denoted by 90.

The receiving method 90 starts with receiving the receive signal 14 including a plurality of signal blocks each having a plurality of data symbols. At step 92 overlapping signal blocks are generated on the basis of the plurality of signal blocks by means of the block overlap 28. At step 94 the signal block separation unit 36 removes an overlapping end part of the overlapping signal blocks and provides correspondingly a reduced overlapping signal block as schematically shown in FIG. 5. At step 96 a subset of data symbols are detected by means of the symbol detector 38 and the reduced overlapping signal block is fed back to the cyclical prefix reconstruction as shown at step 98. After the cyclic prefix reconstruction 98, an overlapping end part of the overlapping signal block is removed by means of the signal block separation unit 36 as shown at step 94. Hence, the overlapping end part is removed iteratively as shown in FIG. 5 in order to reduce the interference 54.

Figure 9:
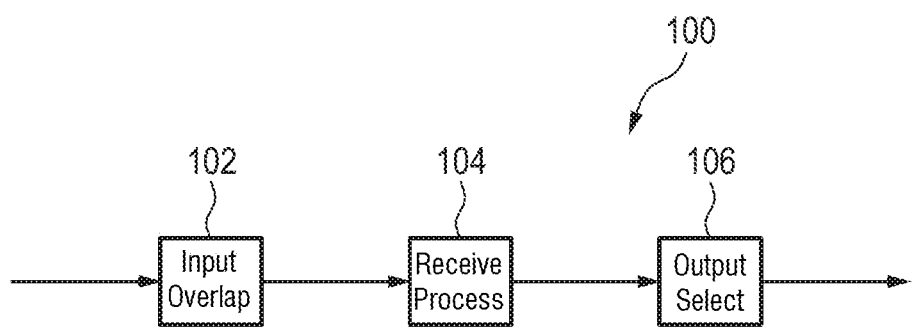
FIG. 9 shows a flow diagram of a receiving method of a further embodiment of the present disclosure.

FIG. 9 shows a schematic flow diagram of a receiving method according to one embodiment of the present disclosure. The method is generally denoted by 100.

The method 100 starts with receiving the receive signal 14 including a plurality of signal blocks each having a plurality of data symbols. At step 102 processing blocks 70 are determined by the input block processing unit 22, wherein each processing block 70 comprises a data block 72 and an overlapping part of a following processing block as shown schematically in FIG. 6. At step 104, the processing blocks are processed e.g. by means of the receiver 10 as shown in FIG. 6 and at step 106, the overlapping part is removed by the output selection unit 24 as shown in FIG. 6.

The input block processing unit 22 determines the length of the overlapping part 74 on the basis of the channel impulse response and preferably identical with or smaller than the length of the channel impulse response.

Obviously, numerous modifications and variations of the present disclosure are possible in light of the above teachings. It is therefore to be understood that within the scope of the appended claims, the disclosure may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software. Any reference signs in the claims should not be construed as limiting the scope.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the invention.

It follows a list of further embodiments of the disclosed subject matter:

1. A receiver unit comprising:
   a signal input configured to receive a receive signal including a plurality of data symbols, a symbol detection circuit configured to detect a subset of data symbols, a reliability measuring circuit configured to determine a reliability value for the data symbols, a feedback loop configured to detect the subset of data symbols and/or the reliability value iteratively, and a signal output circuitry configured to determine output values of the subset of data symbols on the basis of the detected subset of data symbols and the determined reliability value.

2. The receiver unit as defined in embodiment 1, further comprising a frequency domain equalizer configured to provide equalized symbols, wherein the a symbol detection circuit is configured to detect the subset of data symbols on the basis of the equalized symbols.

3. The receiver unit as defined in any preceding embodiment, wherein the reliability measuring circuit is configured to determine the reliability value on the basis of a difference between the equalized symbols and the detected subset of data symbols and/or the plurality of possible symbols.

4. The receiver unit as defined in any preceding embodiment, wherein the reliability measuring circuit is configured to determine the reliability value on the basis of an Euclidean distance or a Log-Likelihood-Ratio between the equalized symbol and the detected symbol and/or the plurality of possible symbols.

5. The receiver unit as defined in any preceding embodiment, wherein the reliability measuring circuit is configured to determine the reliability values of a plurality of detected data symbols and to feed one of the detected data symbols back via the feedback loop on the basis of the respective reliability value.

6. The receiver unit as defined in any preceding embodiment, wherein the feedback loop is connected to the frequency domain equalizer and wherein the frequency domain equalizer is configured to adapt filter coefficients on the basis of the reliability value.

7. The receiver unit as defined in any preceding embodiment, wherein the frequency domain equalizer comprises a feed-forward filter and a feed-back filter and wherein the frequency domain equalizer is configured to adjust a weight between the feed-forward filter and feedback filter on the basis of the reliability value.

8. The receiver unit as defined in any preceding embodiment, further comprising a cyclic prefix reconstruction unit, wherein the signal output circuitry is configured to feed the output values back to the cyclic prefix reconstruction unit.

9. The receiver unit as defined in any preceding embodiment, further comprising an inter-block interference calculation unit, wherein the signal output circuitry is configured to feed the output values of a final iteration step back to the inter-block interference calculation unit.

10. The receiver unit as defined in any preceding embodiment, further comprising a block overlap generation circuit configured to generate an overlapping signal block on the basis of the plurality of signal blocks, an overlapping block separation circuit configured to remove an overlapping end part from the overlapping signal block and to provide a reduced overlapping signal block, wherein the symbol detection circuit is configured to detect a subset of data symbols on the basis of the overlapping signal block, and wherein the feedback loop is configured to feed the reduced overlapping signal block back and to remove the overlapping signal block iteratively.

11. The receiver unit as defined in any preceding embodiment, further comprising a processing block generation circuit configured to determine processing blocks, wherein each processing block comprises a data block and an overlapping part of a following processing block, wherein the processing block generation circuit is configured to determine a length of the overlapping part on the basis of a channel impulse response.

12. A receiver unit comprising:

a signal input configured to receive a receive signal including a plurality of signal blocks each having a plurality of data symbols, block overlap generation circuit configured to generate an overlapping signal block on the basis of the plurality of signal blocks, an overlapping block separation circuit configured to remove an overlapping end part from the overlapping signal block and to provide a reduced overlapping signal block, a symbol detection circuit configured to detect a subset of data symbols on the basis of the overlapping signal block, and a feedback loop configured to feed the reduced overlapping signal block back and to remove the overlapping signal block iteratively.

13. The receiver unit as defined in embodiment 12, further comprising a cyclic prefix reconstruction circuitry connected to the feedback loop and configured to receive the detected data symbols.

14. The receiver unit as defined in embodiment 12 or 13, wherein the overlapping block separation circuit is configured to separate one half of the overlapping signal block.

15. The receiver unit as defined in any of the embodiments 12 to 14, wherein the overlapping block separation circuit is configured to remove a plurality of overlapping blocks in a plurality of iteration steps.

16. The receiver unit as defined in any of the embodiments 12 to 15, wherein the overlapping block separation circuit is configured to determine a length of the overlapping end part on the basis of a channel impulse response.

17. The receiver unit as defined in any of the embodiments 12 to 16, further comprising a processing block generation circuit configured to determine processing blocks, wherein each processing block comprises a data block and an overlapping part of a following processing block, wherein the processing block generation circuit is configured to determine a length of the overlapping part of a following processing block on the basis of a channel impulse response.

18. A receiver unit comprising:

a signal input configured to receive a receive signal including a plurality of signal blocks each having a plurality of data symbols, a processing block generation circuit configured to determine processing blocks, wherein each processing block comprises a data block and an overlapping part of a following processing block, wherein the processing block generation circuit is configured to determine a length of the overlapping part on the basis of a channel impulse response.

19. The receiver unit as defined in embodiment 18, further comprising an inter-block interference canceller connected to the processing block generation circuit for receiving the processing blocks.

20. The receiver unit as defined in embodiment 18 or 19, wherein the processing block generation circuit is configured to determine the length of the overlapping part being identical with or smaller than the channel impulse response.

21. The receiver unit as defined in any of the embodiments 18 to 20, further comprising an output selection circuitry connected to receive a processed processing block and configured to remove a part of the processed processing block corresponding to the overlapping part.

22. A receiving method comprising:
 receiving a receive signal including a plurality of data symbols,
 detecting a subset of data symbols by means of a symbol detection circuit,
 determining a reliability value for the data symbols,
 detecting the subset of data symbols and/or the reliability value iteratively via a feedback loop, and
 providing output values of the subset of data symbols on the basis of the detected subset of data symbols and the determined reliability value.

23. A receiving method comprising:
 receiving a receive signal including a plurality of signal blocks each having a plurality of data symbols,
 generating an overlapping signal block on the basis of the plurality of signal blocks,
 removing an overlapping end block from the overlapping signal block and providing a reduced overlapping signal block,
 detecting a subset of data symbols on the basis of the overlapping signal block, and
 feeding the reduced overlapping signal block back and removing the overlapping signal block iteratively.

24. A receiving method comprising:
 receiving a receive signal including a plurality of signal blocks each having a plurality of data symbols,
 determining processing blocks, wherein each processing block comprises a data block and an overlapping part of a following processing block, wherein a length of the overlapping part is determined on the basis of a channel length.

25 A computer program comprising program code means for causing a computer to perform the steps of said method as defined in any of the embodiments 22 to 24 when said computer program is carried out on a computer.

26. A non-transitory computer-readable recording medium that stores therein a computer program product, which, when executed by a processor, causes the method according to any of the embodiments 22 to 24 to be performed.

The invention claimed is:

1. A receiver comprising:
 a signal input circuitry configured to receive a signal including a plurality of data symbols,
 a symbol detection circuitry configured to detect a subset of the plurality of data symbols,
 a reliability measuring circuitry configured to determine a reliability value for the subset of data symbols,
 a feedback loop configured to detect the subset of data symbols and the reliability value iteratively, and
 a signal output circuitry configured to determine output values of the subset of data symbols based on the detected subset of data symbols and the determined reliability value, wherein
 the reliability measuring circuitry is configured to determine the reliability value of a plurality of detected data symbols and to feed one of the detected data symbols back via the feedback loop based on the respective reliability value.

2. The receiver as claimed in claim 1, further comprising:
 a frequency domain equalizer configured to provide equalized symbols, wherein the symbol detection circuitry is configured to detect the subset of data symbols based on the equalized symbols.

3. The receiver as claimed in claim 2, wherein the reliability measuring circuitry is configured to determine the reliability value based on at least one of a difference between the equalized symbols and the detected subset of data symbols and a plurality of possible symbols.

4. The receiver as claimed in claim 2, wherein the feedback loop is connected to the frequency domain equalizer and wherein the frequency domain equalizer is configured to adapt filter coefficients based on the reliability value.

5. The receiver as claimed in claim 1, wherein the reliability measuring circuitry is configured to determine the reliability value based on at least one of an Euclidean distance or a Log-Likelihood-Ratio between an equalized symbol and the detected subset of data symbols and a plurality of possible symbols.

6. The receiver as claimed in claim 1, further comprising:
 a block overlap generation circuitry configured to generate an overlapping signal block based on a plurality of signal blocks, an overlapping block separation circuitry configured to remove an overlapping end part from the overlapping signal block and to provide a reduced overlapping signal block, wherein the symbol detection circuitry is configured to detect the subset of data symbols based on the overlapping signal block, and wherein the feedback loop is configured to feed the reduced overlapping signal block back and to remove the overlapping signal block iteratively.

7. The receiver as claimed in claim 1, further comprising:
 a processing block generation circuitry configured to determine processing blocks, wherein each processing block comprises a data block and an overlapping part of a following processing block, wherein the processing block generation circuitry is configured to determine a length of the overlapping part based on a channel impulse response.

8. A receiver comprising:
 a signal input circuitry configured to receive a signal including a plurality of signal blocks each having a plurality of data symbols,
 a block overlap generation circuitry configured to generate an overlapping signal block based on the plurality of signal blocks,
 an overlapping block separation circuitry configured to remove an overlapping end part from the overlapping signal block and to provide a reduced overlapping signal block,
 a symbol detection circuitry configured to detect a subset of data symbols based on the overlapping signal block, and
 a feedback loop configured to feed the reduced overlapping signal block back and to remove the overlapping signal block iteratively.

9. The receiver as claimed in claim 8, further comprising: a cyclic prefix reconstruction circuitry connected to the feedback loop and configured to receive the detected subset of data symbols.

10. The receiver as claimed in claim 8, wherein the overlapping block separation circuitry is configured to separate one half of the overlapping signal block.

11. The receiver as claimed in claim 8, wherein the overlapping block separation circuitry is configured to remove a plurality of overlapping blocks in a plurality of iteration steps.

12. The receiver as claimed in claim 8, wherein the overlapping block separation circuitry is configured to determine a length of the overlapping end part based on a channel impulse response.

13. The receiver as claimed in claim 8, further comprising: a processing block generation circuitry configured to determine processing blocks, wherein each processing block comprises a data block and an overlapping part of a following processing block, wherein the processing block generation circuitry is configured to determine a length of the overlapping part of a following processing block based on a channel impulse response.

14. A receiving method comprising:
receiving a signal including a plurality of data symbols,
detecting a subset of the plurality of data symbols by a symbol detection circuitry,
determining a reliability value for the subset of data symbols,
detecting the subset of data symbols and the reliability value iteratively via a feedback loop, and
providing output values of the subset of data symbols based on the detected subset of data symbols and the determined reliability value, wherein
the determining a reliability includes determining the reliability value of a plurality of detected data symbols and to feeding one of the detected data symbols back via the feedback loop based on the respective reliability value.

15. A non-transitory computer-readable recording medium that stores therein a computer program product, which, when executed by a processor, causes the method according to claim 14 to be performed.

* * * * *